(12) United States Patent
Sugaya

(10) Patent No.: US 9,799,123 B2
(45) Date of Patent: Oct. 24, 2017

(54) INFORMATION IDENTIFICATION SYSTEM, METHOD OF IDENTIFYING INFORMATION, AND PROGRAM FOR IDENTIFYING INFORMATION

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 2 days.

(21) Appl. No.: 14/982,273

(22) Filed: Dec. 29, 2015

(65) Prior Publication Data
US 2017/0076175 A1   Mar. 16, 2017

(30) Foreign Application Priority Data

Sep. 15, 2015   (JP) ................. 2015-181748

(51) Int. Cl.
| | |
|---|---|
| G06K 9/62 | (2006.01) |
| G06T 7/60 | (2017.01) |
| G06T 7/40 | (2017.01) |
| G06K 9/00 | (2006.01) |
| G06T 7/90 | (2017.01) |

(52) U.S. Cl.
CPC ............ G06T 7/40 (2013.01); G06K 9/00637 (2013.01); G06K 9/00771 (2013.01); G06T 7/60 (2013.01); G06T 7/90 (2017.01); G06T 2207/10016 (2013.01); G06T 2207/30232 (2013.01)

(58) Field of Classification Search
CPC ......... G06K 9/6201; G06T 7/40; G06T 7/408; G06T 7/60
See application file for complete search history.

(56) References Cited

U.S. PATENT DOCUMENTS

| | | | |
|---|---|---|---|
| 2009/0067725 A1* | 3/2009 | Sasakawa | G01C 11/04 382/190 |
| 2015/0022656 A1* | 1/2015 | Carr | G06K 9/0063 348/117 |

FOREIGN PATENT DOCUMENTS

| | | | | |
|---|---|---|---|---|
| JP | 2014-044503 | | 3/2014 | |
| WO | WO 2015/199772 | * | 12/2015 | ............. G01C 11/26 |

* cited by examiner

*Primary Examiner* — David F Dunphy
(74) *Attorney, Agent, or Firm* — Lex IP Meister, PLLC

(57) ABSTRACT

The present invention is to provide an information identification system, a method of identifying information, and a program for identifying information to efficiently identify information by considering information on an object existing in the imaged area when identifying information from an image. The information identification system 10 that identifies information on an object imaged in the image previously registers information on the object existing in a predetermined area, detects the location information of the image and identifies which area the location information belongs to, detects the feature amount of the object imaged in the image, and matches the identified area information and the detected feature amount to the database and identifies information on the object imaged in the image.

10 Claims, 4 Drawing Sheets

| AREA | OBJECT TYPE |
|---|---|
| A | Object1 Object2 Object3 |
| B | Object2 Object4 |
| C | Object1 Object5 Object3 |
| D | Object6 |
| : | : |

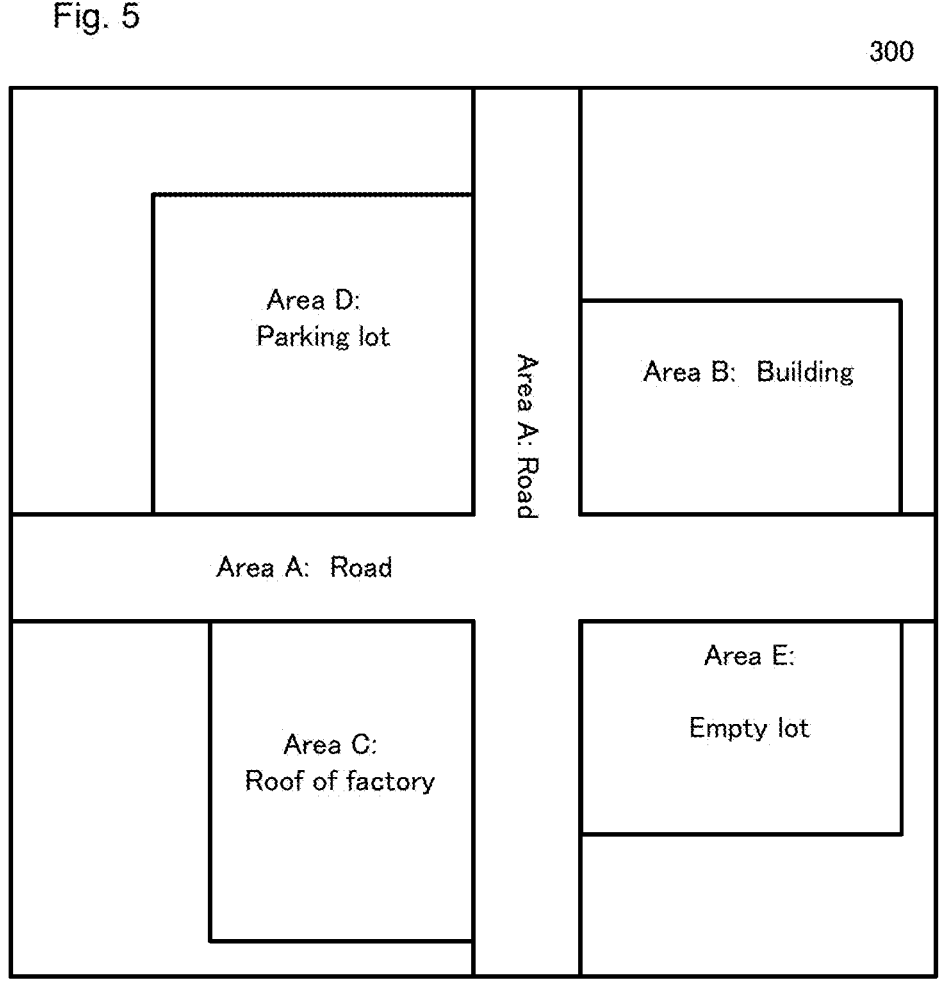

INFORMATION IDENTIFICATION SYSTEM, METHOD OF IDENTIFYING INFORMATION, AND PROGRAM FOR IDENTIFYING INFORMATION

CROSS REFERENCE TO RELATED APPLICATIONS

This application claims priority to Japanese Patent Application No. 2015-181748 filed on Sep. 15, 2015, the entire contents of which are incorporated by reference herein.

TECHNICAL FIELD

The present invention relates to an information identification system, a method of identifying information, and a program for identifying information that identifies information from an image.

BACKGROUND ART

In recent years, the importance of a sensor to gather information is increasing as the IoT (Internet of Things) spreads. A data center receives information obtained by a sensor installed at a site to analyze a situation of the site and to notify the situation to a manager.

It is known to use a camera as a sensor. It is possible to confirm whether any abnormality occurs or not at the site by performing image analysis on the image which is imaged by the onsite camera. For instance, it is known a method for detecting the existence of any suspicious person at the place from the image and informing the detection to the manager.

When applying the method of identifying information by analyzing the image, it is difficult to identify information in case there is no remarkable difference in the feature amount of information to be identified compared with a usual image. For instance, when a suspicious person shows up within the image range of the camera as described above, it is not difficult to detect a suspicious person in case the person is imaged with a camera by which no person is usually imaged, but it is difficult to identify a suspicious person among the persons in case the person is imaged with a camera by which many persons are usually imaged. That is, the way to calculate the feature amount to identify information becomes a problem.

On the other hand, a method of identifying information to analyze the feature amount of an image of person's face is disclosed (for instance, see Patent Document 1). In Patent Document 1, a reliability of the feature amount data based on the size of the face area is calculated from the image data and matched to the database to recognize the object person. Thus, it is known that information can be identified by extracting the feature amount of the image and matching the database concerning the feature amount.

CITATION LIST

Patent Literature

Patent Document 1: JP 2014-044503 A

SUMMARY OF INVENTION

However, such a conventional method is not suitable for identifying information on the image data which is imaged while moving. For instance, when a camera imaged from the sky while moving a certain field, as the color obtained from the image of the parking lot and the road is gray and almost identical, only a little difference can be seen from the image. Therefore, when trying to identify the difference, as the value of the feature amount becomes a little different, information identification becomes difficult. In this case, identifying of information might not be accurate as a result. The inventor has paid attention that there is a limitation of identifying information only from the image, and it may become more efficient by also referring to other information.

Accordingly, an objective of the present invention is to provide an information identification system, a method of identifying information, and a program for identifying information to efficiently identify information by considering information on the object existing in the imaged area when identifying information from an image.

In the present invention, the following resolution approaches are provided.

According to the first aspect of the present invention, an information identification system that identifies information on an object imaged in an image, includes:

a database that previously registers information on the object existing in a predetermined area;

an area attribute identification unit that detects the location information of the image and identifies which area the location information belongs to;

a feature amount detection unit that detects the feature amount of the object imaged in the image; and a object information identification unit that matches the identified area information and the detected feature amount to the database and identifies information on the object imaged in the image.

According to the first aspect of the present invention, an information identification system to identify information on the object imaged in the image, previously registers information on the object existing in a predetermined area, detects the location information of the image and identifies which area the location information belongs to, detects a feature amount of the object imaged in the image, and matches the identified area information and the detected feature amount to the database and identifies information on the object imaged in the image.

According to the second aspect of the present invention, the information identification system according to the first aspect of the present invention, wherein the feature amount detection unit that detects the feature amount based on at least any one of the thickness, the color, the texture, and the geometrical feature amount of the image.

According to the second aspect of the present invention, the information identification system according to the first aspect of the present invention detects the feature amount based on at least any one of the thickness, the color, the texture, and the geometrical feature amount of the image.

According to the third aspect of the present invention, the information identification system according to the first aspect of the present invention, wherein the device that images the image is an unmanned aircraft.

According to the fourth aspect of the present invention, the information identification system to identify information on the object imaged in the image includes:

a connection unit that is connectable with database in which information on an object existing in a predetermined area is previously registered;

an area attribute identification unit that detects the location information of the image and refers to the database to identify which area the location information belongs to;

a feature amount detection unit that detects the feature amount of the object imaged in the image; and an object information identification unit that matches the identified area information and the detected feature amount with the above-mentioned database and identifies information on the object imaged in the image.

According to the fourth aspect of the present invention, the information identification system to identify information on the object imaged in the image, connects with database in which information on an object existing in a predetermined area is previously registered, detects the location information of the image and refers to the database to identify which area the location information belongs to, detects the feature amount of the object imaged in the image, and matches the identified area information and the detected feature amount to the database and identifies information on the object imaged in the image.

The present invention provides an information identification system, a method of identifying information, and a program for identifying information to efficiently identify information by considering information on the object existing in the imaged area when identifying information from an image.

BRIEF DESCRIPTION OF DRAWINGS

FIG. 5 shows another example of the identification of the area.

Embodiments of the present invention are described below with reference to the attached drawings. However, this is illustrative only, and the technological scope of the present invention is not limited thereto.

Configuration of the Information Identification System 10 and the Moving Image Device 100

Figure 1:
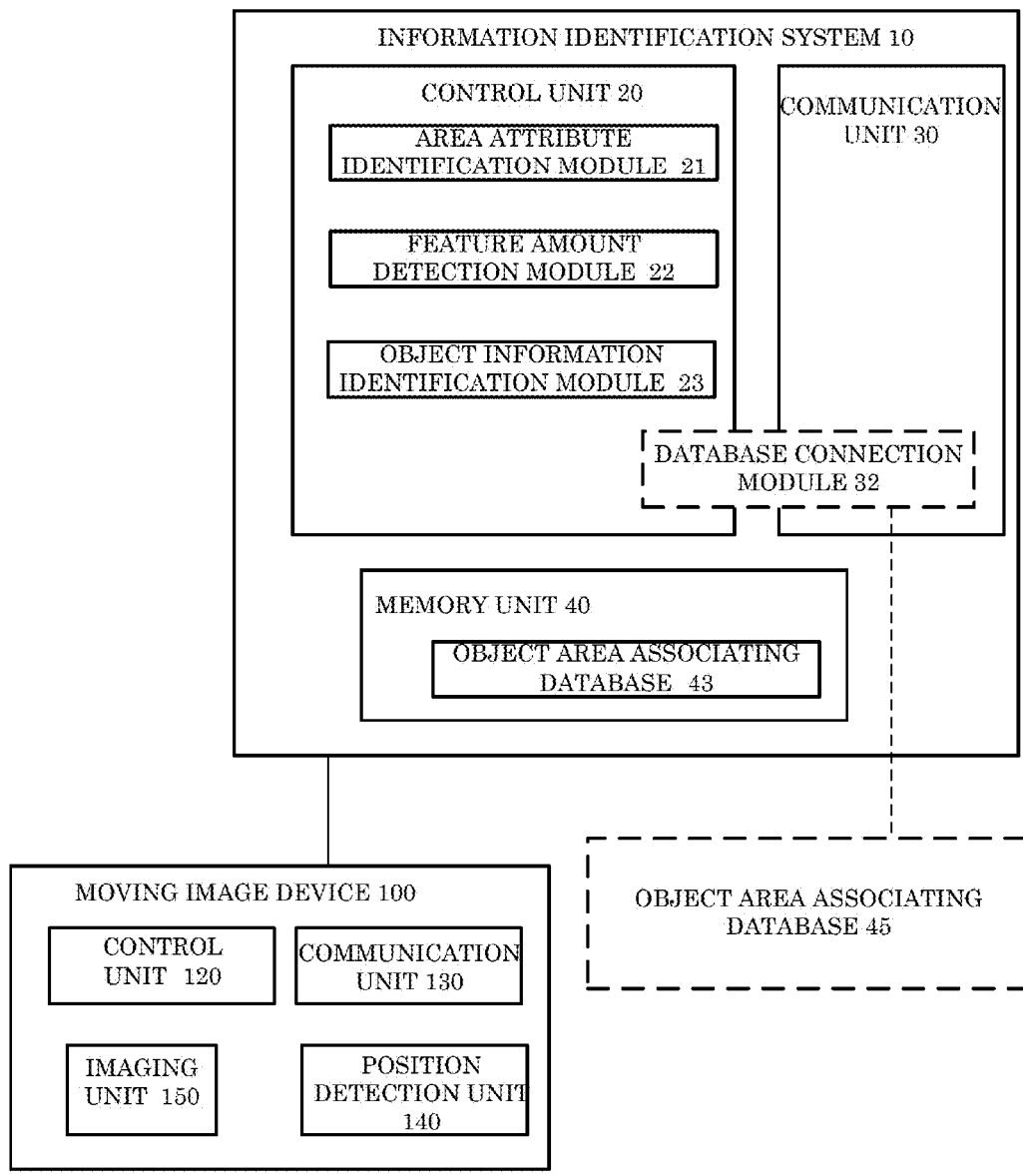
FIG. 1 show a hardware configuration and a software functional block diagram of the information identification system 10 and the moving image device 100.

FIG. 1 shows a block diagram to describe a hardware configuration and the software functionality of the information identification system 10.

The information identification system 10 may be a computer device such as a server, a personal computer, and a smart phone. The information identification system 10 at lease includes a control unit 20 to control data, a communication unit 30 to communicate with other devices, and a memory unit 40 to store data. The information identification system 10 may be provided with an external output unit such as display unit capable of watching an image and data, such as an object identified by the process described later, controlled by the control unit 20. Moreover, the information identification system 10 may include an output unit capable of watching the object identified by the process described below from other terminal.

Object area associating databases 43 and 45 are databases storing an object area associating table associating the object described later with the area. The object area associating databases 43 and 45 may be included in the memory unit 40 of the information identification system 10 in the same way as the object area associating database 43, or may be an external database which is accessible from a database connection module 32 of the communication unit 30 in the same way as the object area associating database 45. The object area associating database 45 may include not only one server but also two or more external servers as an external database.

The control unit 20 includes CPU (Central Processing Unit), RAM (Random Access Memory), and ROM (Read Only Memory), etc. The communication unit 30 includes a device such as a Wireless Fidelity or Wi-Fi® enabled device complying with, for example, IEEE 802.11 enabling to communication with other devices. Moreover, a memory unit 40 is a device to store data and provided with data storage unit such as a hard disk, a semiconductor memory, a recording medium or a memory card.

In the information identification system 10, the control unit 20 reads a predetermined program to achieve an area attribute identification module 21, a feature amount detection module 22, and an object information identification module 23. Moreover, the control unit 20 reads a predetermined program and cooperates with the communication unit 30 to achieve a database connection module 32.

The moving image device 100 may be an unmanned aircraft such as a drone or a multi-copter, and may be the movement type terminals such as a smart phone and a tablet terminal provided with the imaging unit 150 such as a camera and capable of moving around. Moreover, it may be an information device that can be installed in a car, a ship, a train, a bicycle and an airplane, etc.

In addition, the moving image device 100 may include a position detection unit 140 providing with GPS (Global Positioning System) unit to detect a position of the moving image device 100. GPS unit is a GPS receiver receiving a signal from the satellite to detect the position, i.e. latitude and a longitude of the moving image device 100. Moreover, the position detection unit 140 may be an altimeter. That is, when imaging a picture with fixed latitude and longitude in the direction of altitude, the area described later is identified by an altitude measured by an altimeter (ground clearance). The example described later will be explained a case where the area is identified with latitude and longitude, but this example can be also applied in a case where the area is identified in the direction of altitude.

In addition, the moving image device 100 further includes a camera capable of imaging pictures such as CCD (Charge-Coupled Device) and CMOS (Complementary Metal Oxide Semiconductor) as an imaging unit 150. The moving image device 100 includes, in the same way as the information identification system 10, a control unit 120 provided with such as CPU, a communication unit 130 achieving the communication with other equipment, and a data memory unit (not shown) to store data.

The image data imaged by the moving image device 100 may be a still image such as a photograph, or may be data generated by dividing the moving images into multi frames. Moreover, the image data may be an image of a prescribed electromagnetic wave such as infrared rays or may be point group data.

The image data imaged by the imaging unit 150 of the moving image device 100 is associated with the location information (latitude, longitude, and altitude) detected by the position detection unit 140 when the image data is imaged, and stored in a property information of the image data, etc. The communication unit 100 transmits the image data storing the location information to the information identification system 10. The image data may be transmitted just after the image data is imaged.

Informational Identifying Process

Figure 2:
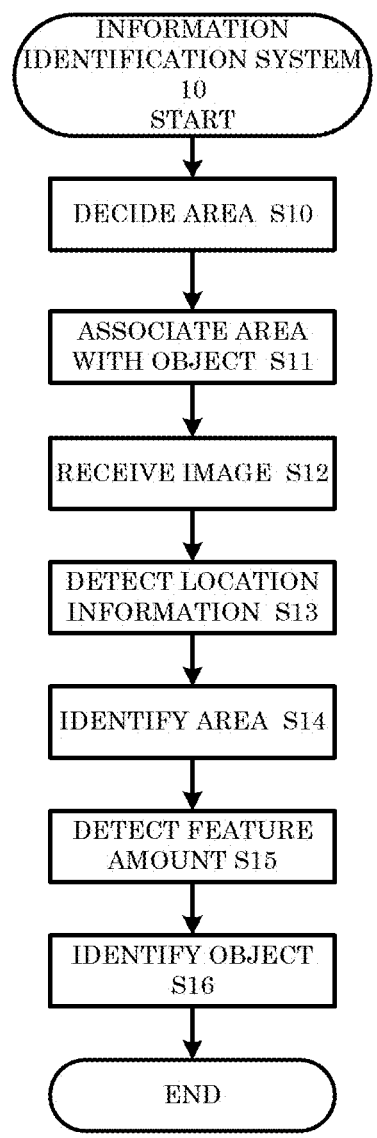
FIG. 2 shows a flow chart of the information identifying process executed by the information identification system 10.

FIG. 2 shows a flow chart of the information identifying process executed by the information identification system 10. The tasks executed by the modules of the above-mentioned hardware and software will be explained below together with this process.

First, the information identification system 10 receives an instruction of the area from the user of the information identification system 10 to decide the areas (step S10). That is, the information identification system 10 receives the values of latitude and longitude to identify an entire range imaged by the moving image device 100, and also receives the operation to divide the entire rage into two or more areas. As a result, two or more areas are formed in the imaged range. The area may be identified by dividing the imaged range into square-shaped areas with regular interval, or identified the area with flexible size and flexible shape so that each associated object can be distinguished (as described later in FIG. 5).

Figures 3, 4:
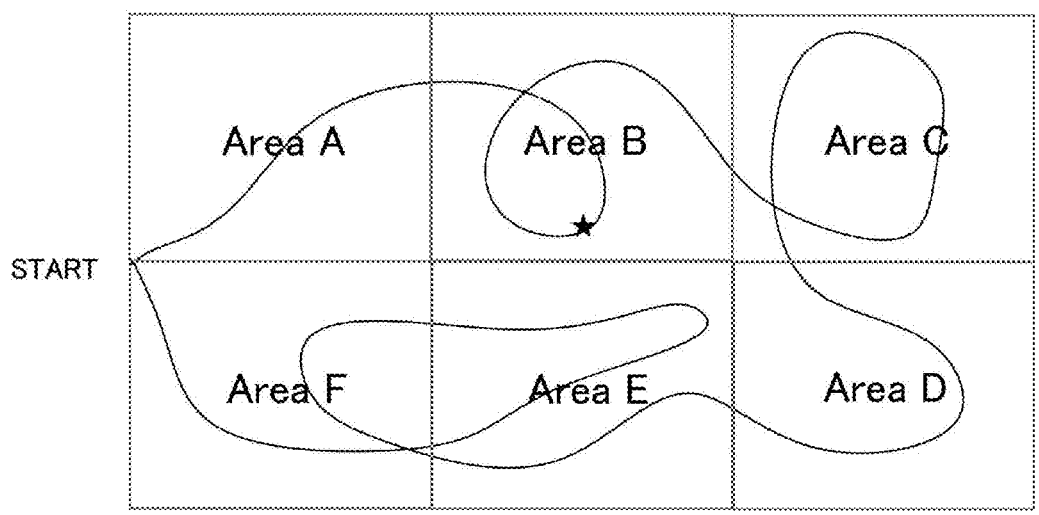
FIG. 3 shows a conceptual diagram showing the moving image device 100 to have been moved in the area.
FIG. 4 shows an example of the object area associating table that associating the imaging area with the object type.

Next, the information identification system 10 receives the association between the area imaged by the moving image device 100 and information on the object existing in the area (step S11), and generates the object area associating table shown in FIG. 4. For instance, as shown in FIG. 3, when the object area imaged by the moving image device 100 (location range where the image data can be acquired) includes areas A to F, a user identifies what object exists is each area, that is area A, B, etc.

For instance, in the example of FIG. 4, the objects 1, 2, and 3 existing in area A are associated with area A, and the objects 2 and 4 existing in area B are associated with area B. The object mentioned here includes an "object" made of such as specific materials and substances, which is not only a concrete, a house tile, a car, and a soil, but also a road, a parking lot, a park, and building that can be distinguished.

Next, the imaging is actually started, and in this example the moving image device 100 begins moving from "START" and moves along the curve as shown in FIG. 3. Here, it moves in the sequence of START→area A→B→C→D→E→F→START (return to the origin) (suitably, the altitude from the ground to image data is fixed to constant height). The image data is imaged after moved or while moving at predetermined timing, and the information identification system 10 receives the image data as the image from the moving image device 100 (step S12). Then, an area attribute identification module 21 detects the position of the imaged image data from the location information (longitude and latitude) associated with the property of the image data (step S13) and identifies the area to which the imaged image data belongs (step S14). For instance, the image data including the location information of the star mark in FIG. 3 is area B.

And, the feature amount detection module 22 detects the feature amount (for instance, feature amount of RGB output) of the received image data (step S15). The method for detecting the feature amount may be either of or any combinations of thickness and color (spectral feature amount), texture (spatial feature amount), and geometrical feature amount such as shape or size of the image. Moreover, the feature amount may be detected by converting the image data with the frequency.

Next, the object information identification module 23 matches the area identified by an area attribute identification module 21, the feature amount detected by the feature amount detection module 22, and the object area associating table, to identify the object imaged in the image data (step S16). For instance, in the example above, the image data identified as area B is identified as either object 2 or object 4 by referring to the object area associating table, and then the object can be identified by comparing the detected feature amount with the feature amount of object 2 and object 4. At this time, for identifying information on the object, as the feature amount of the image data has to be compared only with the feature amount of object 2 and object 4, it becomes possible to comparatively reduce the computational complexity to identify the object.

In the above-mentioned example, as shown in FIG. 3, it has been explained by dividing the imaged range into square-shaped areas with regular interval, the area may be identified by counting backward from the object existing in the imaged range. For instance, in case receiving the identification of the imaged range from the user when identifying the area within the imaged range 300 shown in FIG. 5, a map data matched with the latitude and the longitude of the imaged range may be loaded and the object is roughly identified from the image data and the textual information etc. of the map data, then the identified range is identified as an area. For instance, in the example of FIG. 5, the range of "road" is roughly identified from the image data and the textual information. Therefore, the range is identified as area A, and for other range, a building part is also roughly identified as area B etc. And, if the object is identified after an image data is acquired, specific accuracy of the object can be improved.

To achieve the means and the functions that are described above, a computer (including CPU, an information processor, and various terminals) reads and executes a predetermined program. For example, a program is provided in a form recorded in a computer-readable recording medium such as a flexible disk, a CD (e.g., CD-ROM), a DVD (e.g., DVD-ROM and DVD-RAM), and a Blu-ray. In this case, a computer reads a program from the recording medium, forwards and stores the program to and in an internal or an external storage, and executes it. For example, the program may be previously recorded in a memory (a record medium) such as a magnetic disk, an optical disk, a magnetic optical disk, and a hard disk, and then provided from the memory to the computer through a communication line.

The embodiments of the present invention are described above. However, the present invention is not limited to these embodiments. In addition, the effects described in these embodiments merely illustrate the most preferable effects resulting from the present invention, and the effects according to the present invention are not limited to those described in these embodiments.

REFERENCE SIGNS LIST

10 Information identification system
100 Moving image device
45 Object area associating database

What is claimed is:
1. An information identification system, comprising:
a database including information on at least one object existing in each of a plurality of areas into which an entire range to be imaged by an image device are divided;
an area attribute identification unit that detects location information of an image imaged by the image device and identifies which area the location information belongs to among the plurality of areas;
a feature amount detection unit that detects a feature amount of an object imaged in the image; and
an object information identification unit that identifies information on the object imaged in the image by comparing the detected feature amount with the infor- mation on the at least one object which is included in the database in association with the identified area.

2. The information identification system according to claim 1, wherein the feature amount detection unit detects the feature amount based on at least any one of a thickness, a color, a texture, and a geometrical feature amount of the image.

3. The information identification system according to claim 1, wherein the image device is an unmanned aircraft, and
wherein the area attribute identification unit detects height information on the image by an altimeter installed in the unmanned aircraft, and the location information includes the height information.

4. An information identification system, comprising:
a connection unit that is connectable to an external database including information on at least one object existing in each of a plurality of areas into which an entire range to be imaged by an image device are divided;
an area attribute identification unit that detects location information of an image imaged by the image device and identifies which area the location information belongs to among the plurality of areas;
a feature amount detection unit that detects a feature amount of an object imaged in the image; and
an object information identification unit that identifies information on the object imaged in the image by comparing the detected feature amount with the information on the at least one object which is included in the database in association with the identified area.

5. The information identification system according to claim 4, wherein the feature amount detection unit detects the feature amount based on at least any one of a thickness, a color, a texture, and a geometrical feature amount of the image.

6. The information identification system according to claim 4, wherein the image device is an unmanned aircraft, and
wherein the area attribute identification unit detects height information on the image by an altimeter installed in the unmanned aircraft, and the location information includes the height information.

7. A method of identifying information performed by an information identification system, comprising:
registering information on at least one object existing in each of a plurality of areas into which an entire range to be imaged by an image device are divided to a database;
detecting location information of an image imaged by the image device and identifying which area the location information belongs to among the plurality of areas;
detecting a feature amount of an object imaged in the image; and
identifying information on the object imaged in the image by comparing the detected feature amount with the information on the at least one object which is included in the database in association with the identified area.

8. A method of identifying information performed by an information identification system, comprising:
connecting to an external database including information on at least one object existing in each of a plurality of areas into which an entire range to be imaged by an image device are divided;
detecting location information of an image imaged by the image device and identifying which area the location information belongs to among the plurality of areas;
detecting a feature amount of an object imaged in the image; and
identifying information on the object imaged in the image by comparing the detected feature amount with the information on the at least one object which is included in the database in association with the identified area.

9. A computer program product for use in an information identification system, comprising a non-transitory computer usable medium having a set of instructions physically embodied therein, the set of instructions including computer readable program code, which when executed by the information identification system causes an information processing unit to:
register information on at least one object existing in each of a plurality of areas into which an entire range to be imaged by an image device are divided to a database;
detect location information of an image imaged by the image device and identify which area the location information belongs to among the plurality of areas;
detect a feature amount of an object imaged in the image; and
identify information on the object imaged in the image by comparing the detected feature amount with the information on the at least one object which is included in the database in association with the identified area.

10. A computer program product for use in an information identification system, comprising a non-transitory computer usable medium having a set of instructions physically embodied therein, the set of instructions including computer readable program code, which when executed by the information identification system causes an information processing unit to:
connect to an external database including information on at least one object existing in each of a plurality of areas into which an entire range to be imaged by an image device are divided;
detect location information of an image imaged by the image device and identify which area the location information belongs to among the plurality of areas;
detect a feature amount of the object imaged in the image; and
identify information on the object imaged in the image by comparing the detected feature amount with the information on the at least one object which is included in the database in association with the identified area.

* * * * *